US009188217B2

(12) United States Patent
Kinoshita

(10) Patent No.: US 9,188,217 B2
(45) Date of Patent: Nov. 17, 2015

(54) RANGE SWITCHING DEVICE

(71) Applicant: Fuji Jukogyo Kabushiki Kaisha, Tokyo (JP)

(72) Inventor: Takahiro Kinoshita, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 13/758,927

(22) Filed: Feb. 4, 2013

(65) Prior Publication Data

US 2013/0233110 A1  Sep. 12, 2013

(30) Foreign Application Priority Data

Mar. 8, 2012  (JP) .................................. 2012-051584

(51) Int. Cl.
  *F16H 59/00*  (2006.01)
  *F16H 59/08*  (2006.01)
  *F16H 61/02*  (2006.01)
  *F16H 61/12*  (2010.01)
  *F16H 61/66*  (2006.01)

(52) U.S. Cl.
  CPC ............ *F16H 59/08* (2013.01); *F16H 61/0246* (2013.01); *F16H 61/12* (2013.01); *F16H 61/66* (2013.01); *F16H 2061/1204* (2013.01); *F16H 2061/1264* (2013.01); *Y10T 74/20024* (2015.01)

(58) Field of Classification Search
  CPC ..... F16H 61/0246; F16H 61/12; F16H 59/08; F16H 2061/1204; F16H 2061/1264; F16H 61/66; F16H 2061/026; F16H 2061/0488; F16H 61/0267; F16H 61/0286; F16H 2061/0485; Y10S 74/01

USPC ..................... 74/335; 475/31–148; 476/9, 10; 477/37–41, 44–46, 130, 131, 160, 161
See application file for complete search history.

(56) References Cited

U.S. PATENT DOCUMENTS

| | | | | |
|---|---|---|---|---|
| 2,852,959 | A | * | 9/1958 | Isaacson et al. ............... 475/131 |
| 3,640,157 | A | * | 2/1972 | Schaefer ........................ 477/126 |
| 3,908,485 | A | * | 9/1975 | Miyauchi et al. .............. 477/117 |
| 4,557,291 | A | * | 12/1985 | Hashimoto .............. 137/596.13 |
| 4,875,892 | A | * | 10/1989 | Sueda ............................... 474/17 |
| 4,967,621 | A | * | 11/1990 | Soga et al. ........................ 477/49 |
| 5,006,093 | A | * | 4/1991 | Itoh et al. ........................ 474/28 |

(Continued)

FOREIGN PATENT DOCUMENTS

| | | |
|---|---|---|
| JP | 2008-128473 A | 6/2008 |
| JP | 2008-128475 A | 6/2008 |

*Primary Examiner* — Ha D Ho
(74) *Attorney, Agent, or Firm* — McGinn IP Law Group PLLC

(57) ABSTRACT

Provided is a range switching device for performing switching among drive, reverse, and neutral ranges of a transmission. The device includes a first switching valve driven by a first actuator and a second switching valve driven by a second actuator. The valves switch an oil channel to transmit the oil pressure from an oil pressure supply source between first state and second states. When the first and second switching valves are in the first and second states respectively, the oil pressure is transmitted to the forward fastening element. When the first and second switching valves are in the second state and first states respectively, the oil pressure is transmitted to the reverse fastening element. When both the valves are in the first or second state, oil pressure transmission to the forward and reverse fastening elements is substantially blocked.

4 Claims, 7 Drawing Sheets

(56) References Cited

U.S. PATENT DOCUMENTS

| | | | | |
|---|---|---|---|---|
| 5,052,247 A | * | 10/1991 | Kato et al. | 477/49 |
| 5,063,816 A | * | 11/1991 | Soga et al. | 477/39 |
| 5,086,672 A | * | 2/1992 | Kato et al. | 477/41 |
| 5,088,355 A | * | 2/1992 | Sugaya et al. | 477/41 |
| 5,211,083 A | * | 5/1993 | Hattori et al. | 477/39 |
| 5,397,284 A | * | 3/1995 | Matsumoto et al. | 477/150 |
| 5,409,434 A | * | 4/1995 | Furukawa et al. | 477/131 |
| 5,487,708 A | * | 1/1996 | Marusue | 475/116 |
| 5,542,888 A | * | 8/1996 | Takada et al. | 475/134 |
| 5,681,241 A | * | 10/1997 | Kubo et al. | 477/130 |
| 5,785,628 A | * | 7/1998 | Kamada et al. | 477/130 |
| 5,875,631 A | * | 3/1999 | Smith | 60/444 |
| 6,063,002 A | * | 5/2000 | Nobumoto et al. | 477/41 |
| 6,343,520 B1 | * | 2/2002 | Ohashi et al. | 74/335 |
| 6,659,906 B2 | * | 12/2003 | Oshidari | 476/10 |
| 7,635,057 B2 | * | 12/2009 | Gierer et al. | 192/85.63 |
| 7,635,058 B2 | * | 12/2009 | Moehlmann et al. | 192/48.601 |
| 8,210,990 B2 | * | 7/2012 | Yoshioka et al. | 477/130 |
| 8,282,529 B2 | * | 10/2012 | Funakoshi et al. | 477/79 |
| 8,371,988 B2 | * | 2/2013 | Long et al. | 477/130 |
| 8,413,783 B2 | * | 4/2013 | Shimizu et al. | 192/85.63 |
| 2009/0258756 A1 | * | 10/2009 | Long et al. | 477/131 |
| 2010/0099537 A1 | * | 4/2010 | Maten et al. | 477/130 |
| 2010/0229969 A1 | * | 9/2010 | Ishikawa et al. | 137/511 |
| 2013/0220052 A1 | * | 8/2013 | Kinoshita et al. | 74/473.11 |

* cited by examiner

RANGE SWITCHING DEVICE

CROSS-REFERENCE TO RELATED APPLICATIONS

The present application claims priority from Japanese Patent Application No. 2012-051584 filed on Mar. 8, 2012, the entire contents of which are hereby incorporated by reference.

BACKGROUND OF THE INVENTION

1. Field of the Invention

The present invention relates to range switching devices that perform switching among drive, reverse, and neutral ranges in an automatic transmission of a vehicle such as an automobile, and more particularly to a range switching device that prevents reverse running and ensures safety even in the case of a failure.

2. Description of the Related Art

In an automatic transmission such as a CVT or a planetary gear step AT provided in an automobile or the like, the drive, reverse, and neutral ranges are switched by controlling the oil pressure supplied to engagement elements such as a forward clutch and a reverse clutch.

Switching among such drive, reverse, and neutral ranges has conventionally been performed by a manual valve connected by a mechanical linkage to an operation lever operated by the driver.

Recently, there has been proposed a technology so-called shift-by-wire system in which switching of running ranges is performed only by electric signals, without providing a mechanical linkage between the operation lever and the transmission.

As an example of a conventional technique relating to shift-by-wire systems of automatic transmission, Japanese Unexamined Patent Application Publication (JP-A) No. 2008-128475 describes a range switching device in which spool valves are actuated by three solenoid valves to switch the oil pressure supplied to drive and reverse hydraulic servos.

Further, JP-A No. 2008-128473 describes a range switching device in which running ranges are switched by two solenoid valves and the running range can be maintained even when either one of the solenoid valves fails in the running range.

However, with the technique described in JP-A No. 2008-128475, when switching between drive and reverse is performed using a drive/reverse switching valve, where a failure mode occurs such that the state of the valve is reversed, abrupt switching can take place from drive to reverse or from reverse to drive.

To resolve this problem, it is possible to increase the fail-safe ability by detecting the failure state and creating different combinations of control states of a plurality of valves, but in this case where the failure detection speed is low, the designed combination is not obtained and the vehicle might run in reverse.

SUMMARY OF THE INVENTION

In view of the above, it is an object of the present invention to provide a range switching device that ensures safety even when a failure occurs.

A first aspect of the present invention provides a range switching device that performs switching among a drive range in which an oil pressure is transmitted to a forward fastening element of a transmission, a reverse range in which the oil pressure is transmitted to a reverse fastening element, and a neutral range in which the oil pressure is substantially not transmitted to either of the forward fastening element and the reverse fastening element. The range switching device includes: a first switching valve that is driven by a first actuator and can switch an oil channel by which the oil pressure from an oil pressure supply source is transmitted, between a first state and a second state; and a second switching valve that is driven by a second actuator and can switch an oil channel by which the oil pressure from an oil pressure supply source is transmitted, between a first state and a second state. When the first switching valve is in the first state and the second switching valve is in the second state, the oil pressure is transmitted to the forward fastening element. When the first switching valve is in the second state and the second switching valve is in the first state, the oil pressure is transmitted to the reverse fastening element. When the first switching valve and the second switching valve are both in the first state or in the second state, oil pressure transmission to the forward fastening element and the reverse fastening element is substantially blocked.

With such a configuration, as a result of performing the switching among the drive range, reverse range, and neutral range by combinations of logical patterns of states of the first and second switching valve, even when a single switching valve or actuator fails, no transition is made from the drive range to the reverse range or from the reverse range to the drive range, and safety can be ensured even when a failure occurs.

Preferably, the oil channel by which the oil pressure is transmitted from the oil pressure supply source to the forward fastening element is constituted by connecting the oil pressure supply source, the first switching valve, the second switching valve, and the forward fastening element in this order, and the oil channel by which the oil pressure is transmitted from the oil pressure supply source to the reverse fastening element is constituted by connecting the oil pressure supply source, the second switching valve, the first switching valve, and the reverse fastening element in this order.

With such a configuration, the above-described effect can be reliably obtained.

Preferably, when the energizing of the first actuator and the energizing of the second actuator are both blocked, the oil pressure transmission to the forward fastening element and to the reverse fastening element is substantially blocked.

With such a configuration, where power supply is interrupted for any reason, the neutral range is assumed, thereby making it possible to increase safety further.

DESCRIPTION OF THE PREFERRED EMBODIMENTS

The present invention provides a range switching device that ensures safety even when a failure occurs is attained by a configuration in which the switching of ranges is performed by combinations of logical patterns of states of two switching valves, and the neutral range is assumed when one switching valve in the drive range or reverse range is reversed.

Embodiment 1

Embodiment 1 of a range switching device according to the present invention is explained below.

The range switching device of according to 1 is provided, for example, at a continuously variable transmission (CVT) that is installed on an automobile such as a passenger car and transmits the output of an engine.

Figure 1:
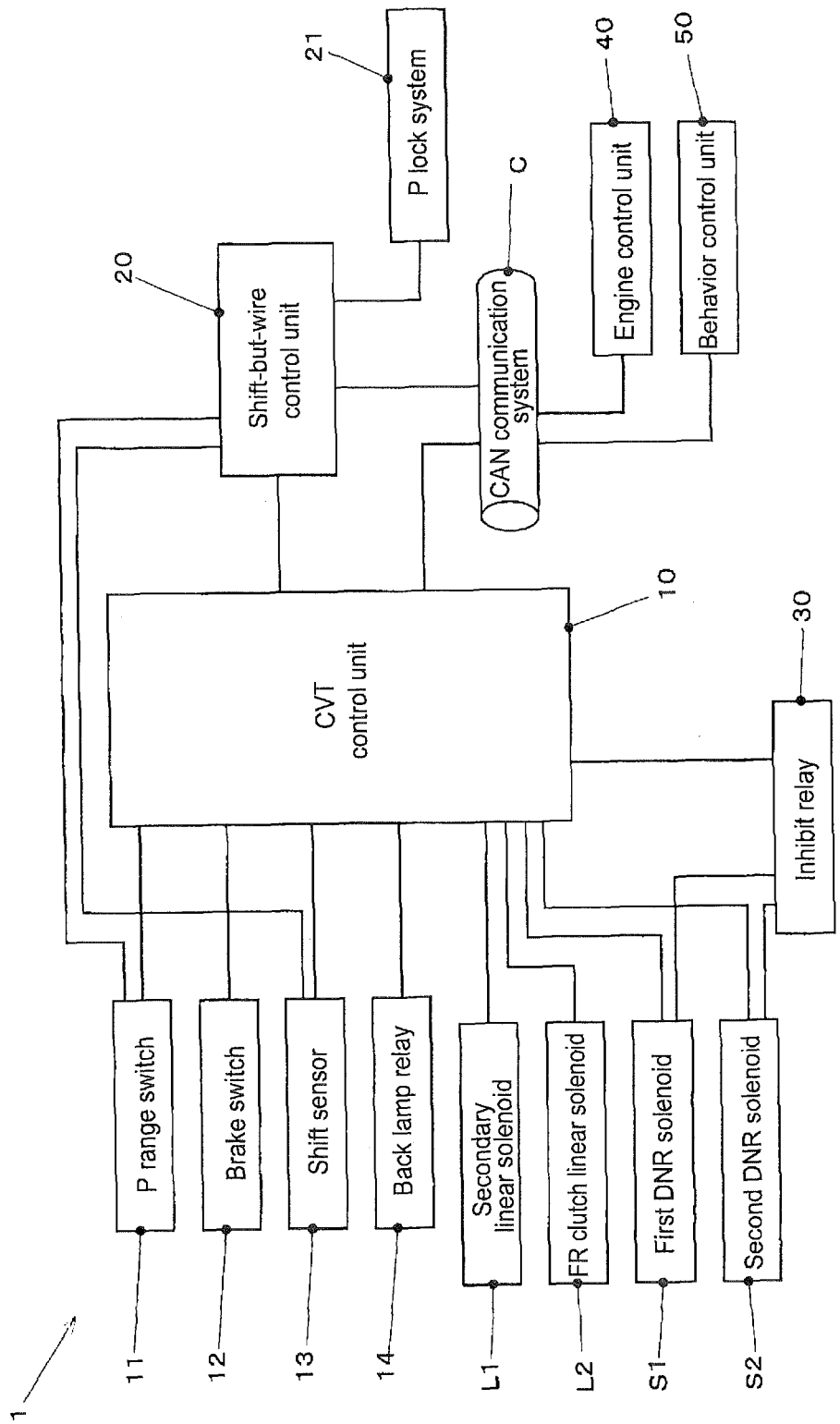
FIG. 1 is a schematic block diagram of a transmission control system including a range switching device of Embodiment 1 according to the present invention.

FIG. 1 is a schematic block diagram of a transmission control system including the range switching device of according to 1.

As shown in FIG. 1, a transmission control system 1 has a CVT control unit 10, a shift-by-wire control unit 20, and an inhibit relay 30 and controls a secondary linear solenoid L1, a FR clutch linear solenoid L2, a first DNR solenoid S1, and a second DNR solenoid S2.

The CVT control unit 10 performs integral control of the CVT and auxiliary device thereof and is constituted by an information processing device such as a CPU, a memory device such as a ROM or a RAM, an input/output interface, and a bus connecting the aforementioned devices.

The CVT control unit 10 performs the shifting control of the CVT and the control of a lock-up clutch (not shown in the figure).

A P range switch 11, a brake switch 12, a shift sensor 13, and a back lamp relay 14 are connected to the CVT control unit 10.

The P range switch 11 is provided in a shift operation unit (not shown in the figure) that is used by the driver for shifting and serves to detect that the operation of selecting a P range has been performed in the shift operation unit.

The brake switch 12 detects whether a brake operation is performed by the driver. The brake switch is ON when the driver steps on a brake pedal (not shown in the figure).

The shift sensor 13 detects whether the driver has selected a range such as D (drive), N (neutral), R (rear), or P (parking) in the shift operation unit.

The back lamp relay 14 lights back lamps on the rear side of the vehicle when the R range is selected.

The outputs of the P range switch 11 and the shift sensor 13 are both also transmitted to the shift-by-wire control unit 20.

The shift-by-wire unit 20 controls the secondary solenoid L1, FR clutch linear solenoid L2, first DNR solenoid S1, and second DNR solenoid S2 through the CVT control unit 10 on the basis of the output of the shifter sensor 13 and switches the D range, N range, and R range.

The shift-by-wire control unit 20 is constituted by an information processing device such as a CPU, a memory device such as a ROM or a RAM, an input/output interface, and a bus connecting the aforementioned devices.

The secondary linear solenoid L1 adjusts the oil pressure supplied from an oil pump (not shown in the figure) and supplies the adjusted pressure to the range switching device.

The FR clutch linear solenoid L2, the first DNR solenoid S1, and the second DNR solenoid S2 supply the oil pressure to the below-described spool valves 100, 200, and 300 to control the spool valves.

In this case, a linear solenoid is used that adjusts the oil pressure according to an electric current, but such configuration is not limiting and, for example, a duty solenoid may be used that adjusts the oil pressure according to a duty ratio.

Further, a P lock system 21 is connected to the shift-by-wire control unit 20.

The P lock system 21 mechanically locks the rotation of the output shaft of the transmission when the P range is selected.

The inhibit relay 30 is provided in a power supply system that supplies power to a starter motor (not shown in the figure). When a range other than the P range or N range is selected, the inhibit relay inhibits the drive of the starter motor, except for the case of automatic start of the engine from the idle stop state.

Further, an engine control unit 40 and a behavior control unit 50 are connected through a CAN communication system C, which is a vehicle LAN, to the CVT control unit 10 and the shift-by-wire control unit 20.

The engine control unit 40 performs the integral control of the engine (not shown in the figure) and the auxiliary device thereof.

The behavior control unit 50 performs a vehicle behavior control by which a difference in a brake force is created between the left and right wheels according to the occurrence of vehicle behavior such as understeering or oversteering, and a moment is generated in the direction of inhibiting such a behavior, or performs an antilock brake control.

The hydraulic circuit of the range switching device of Embodiment 1 is explained below.

Figure 2:
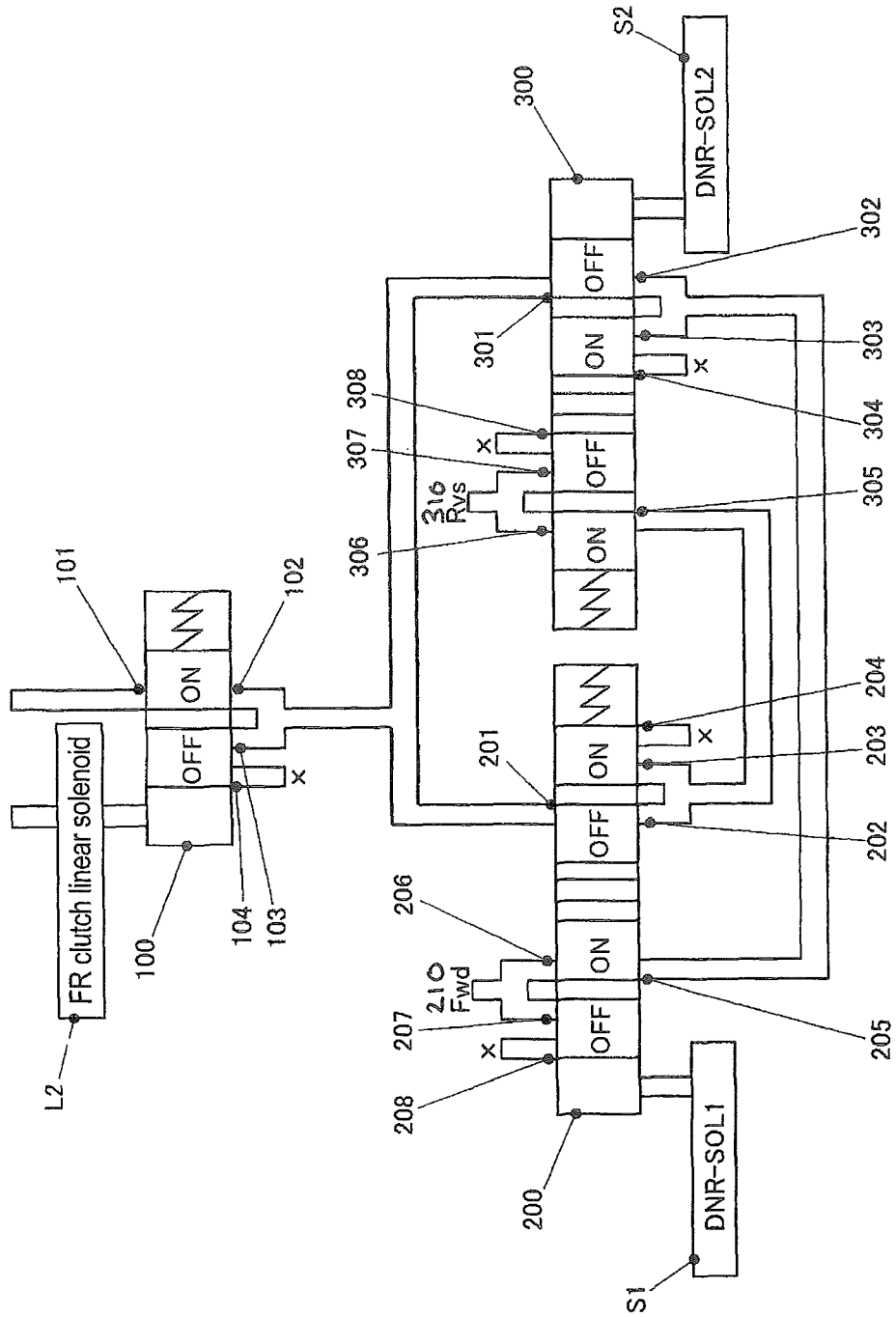
FIG. 2 shows a hydraulic circuit of the range switching device of Embodiment 1.

FIG. 2 shows the hydraulic circuit of the range switching device.

In FIG. 2, the ON and OFF positions of the valve elements of the spool valves are shown together to facilitate the understanding.

The range switching device switches the applied oil pressure to a forward clutch (Fwd) and a reverse clutch (Rvs) (not shown in the figure) and is constituted by spool valves 100, 200, and 300.

In the spool valves 100, 200, and 300, a spool is inserted into a cylindrical sleeve provided with a plurality of ports, and the oil channels are switched by controlling the oil pressure supplied from the solenoids and moving the spools.

More specifically, where an oil pressure is supplied from the solenoids, the valve elements of the spool valves 100, 200, and 300 are set to the ON positions shown in FIG. 2, and where the supply of oil pressure is blocked, the valve elements are set by the biasing force of the springs to the OFF positions shown in FIG. 2.

In the case of a vehicle equipped with an idle stop system that stops the engine when the vehicle is stopped, the biasing force of the springs in the spool valves 100, 200, and 300 may be set such that the running range can be maintained by the discharge pressure of the electric pump.

The spool valve 100 supplies the adjusted line pressure to the spool valves 200 and 300 and is driven by switching the oil pressure supplied from the FR clutch linear solenoid L2.

The spool valve 100 has ports 101, 102, 103, and 104.

The port 101 serves to introduce the line pressure into the spool valve 100.

The port 102 serves to supply an oil pressure from the spool valve 100 to the spool valves 200 and 300.

The port 103 serves to communicate with the port 102 and drain the oil pressure from the port 104 through the interior of the spool valve 100 when the oil pressure is not necessary.

The port 104 serves to drain the oil pressure introduced from the port 103 into the spool valve 100.

In the spool valve 100, when the FR clutch linear solenoid L2 is OFF, the port 101 and the port 102 communicate with each other, and the port 103 and the port 104 are closed.

The spool valve 200 supplies the oil pressure supplied from the port 102 of the spool valve 100 to the spool valve 300 and supplies the oil pressure supplied from the spool valve 300 to the forward clutch.

The spool valve 200 is driven by switching the oil pressure supplied from the first DNR solenoid S1.

The spool valve 200 has ports 201, 202, 203, 204, 205, 206, 207, and 208.

The port 201 serves to introduce the oil pressure supplied from the port 102 into the spool valve 200.

The port 202 serves to supply the oil pressure from the spool valve 200 to the spool valve 300.

The port 203 serves to communicate with the port 202 and drain the oil pressure from the port 204 through the interior of the spool valve 200 when the oil pressure is not necessary.

The port 204 serves to drain the oil pressure introduced from the port 203 into the spool valve 200.

The port 205 serves to introduce the oil pressure supplied from the port 302 of the spool valve 300 into the spool valve 200.

The port 206 serves to supply the oil pressure supplied from the port 205 to the forward clutch 210.

The port 207 serves to communicate with the port 206 and drain the oil pressure from the port 208 through the interior of the spool valve 200 when the oil pressure is not necessary.

The port 208 serves to drain the oil pressure introduced from the port 207 into the spool valve 200.

In the spool valve 200, when the first DNR solenoid S1 is ON, the port 201 and the port 202 communicate with each other, the port 207 and the port 208 communicate with each other, and the ports 203, 204, 205, and 206 are closed.

Further, when the first DNR solenoid S1 is OFF, the port 203 and the port 204 communicate with each other, the port 205 and the port 206 communicate with each other, and the ports 201, 202, 207, and 208 are closed.

The spool valve 300 supplies the oil pressure supplied from the port 102 of the spool valve 100 to the spool valve 200 and also supplies the oil pressure supplied from the spool valve 200 to the reverse clutch.

The spool vale 300 is driven by switching the oil pressure supplied from the second DNR solenoid S2.

The spool valve 300 has ports 301, 302, 303, 304, 305, 306, 307, and 308.

The port 301 serves to introduce the oil pressure supplied from the port 102 into the spool valve 300.

The port 302 serves to supply the oil pressure from the spool valve 300 to the spool valve 200.

The port 303 serves to communicate with the port 302 and drain the oil pressure from the port 304 through the interior of the spool valve 300 when the oil pressure is not necessary.

The port 304 serves to drain the oil pressure introduced from the port 303 into the spool valve 300.

The port 305 serves to introduce the oil pressure supplied from the port 202 of the spool valve 200 into the spool valve 300.

The port 306 serves to supply the oil pressure supplied from the port 305 to the reverse clutch 310.

The port 307 serves to communicate with the port 306 and drain the oil pressure from the port 308 through the interior of the spool valve 300 when the oil pressure is not necessary.

The port 308 serves to drain the oil pressure introduced from the port 307 into the spool valve 200.

In the spool valve 300, when the second DNR solenoid S2 is ON, the port 301 and the port 302 communicate with each other, the port 307 and the port 308 communicate with each other, and the ports 303, 304, 305, and 306 are closed.

Further, when the second DNR solenoid S2 is OFF, the port 303 and the port 304 communicate with each other, the port 305 and the port 306 communicate with each other, and the ports 301, 302, 307, and 308 are closed.

The range switching operation performed in the range switching device of Example 1 is explained below.

<D Range>

Figure 3:
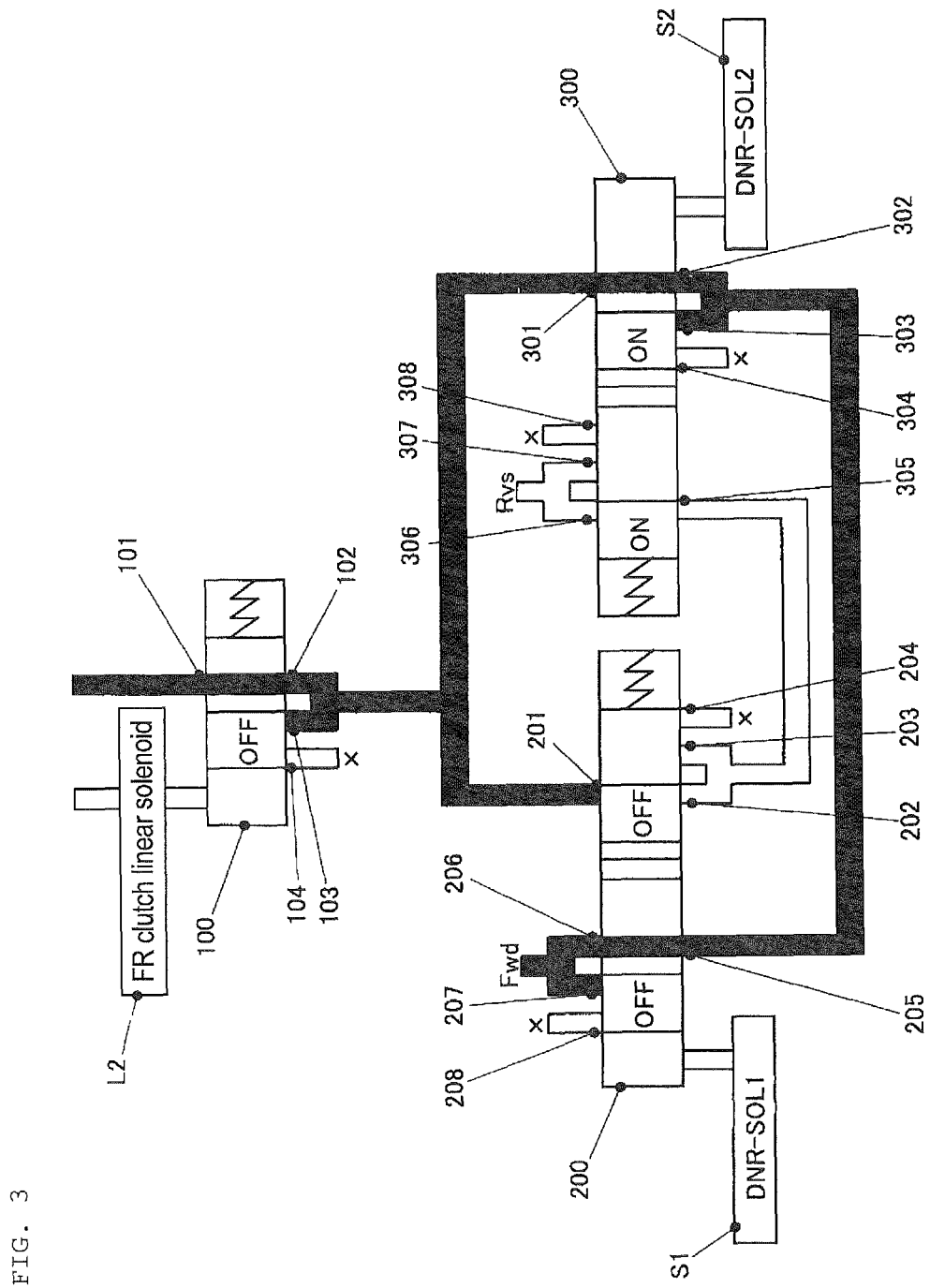
FIG. 3 shows a D range state in the hydraulic circuit shown in FIG. 2.

FIG. 3 illustrates the D range state in the hydraulic circuit of Example 1.

In the state shown in FIG. 3, the FR clutch linear solenoid L2 is OFF, the first DNR solenoid S1 is OFF, and the second DNR solenoid S2 is ON.

As a result, the line pressure is supplied to the forward clutch through the port 101, spool valve 100, port 102, port 301, spool valve 300, port 302, port 205, spool valve 200, and port 206 in this order.

Since the port 201 is closed, the oil pressure from the port 102 is not directly introduced into the spool valve 200.

<R Range>

Figure 4:
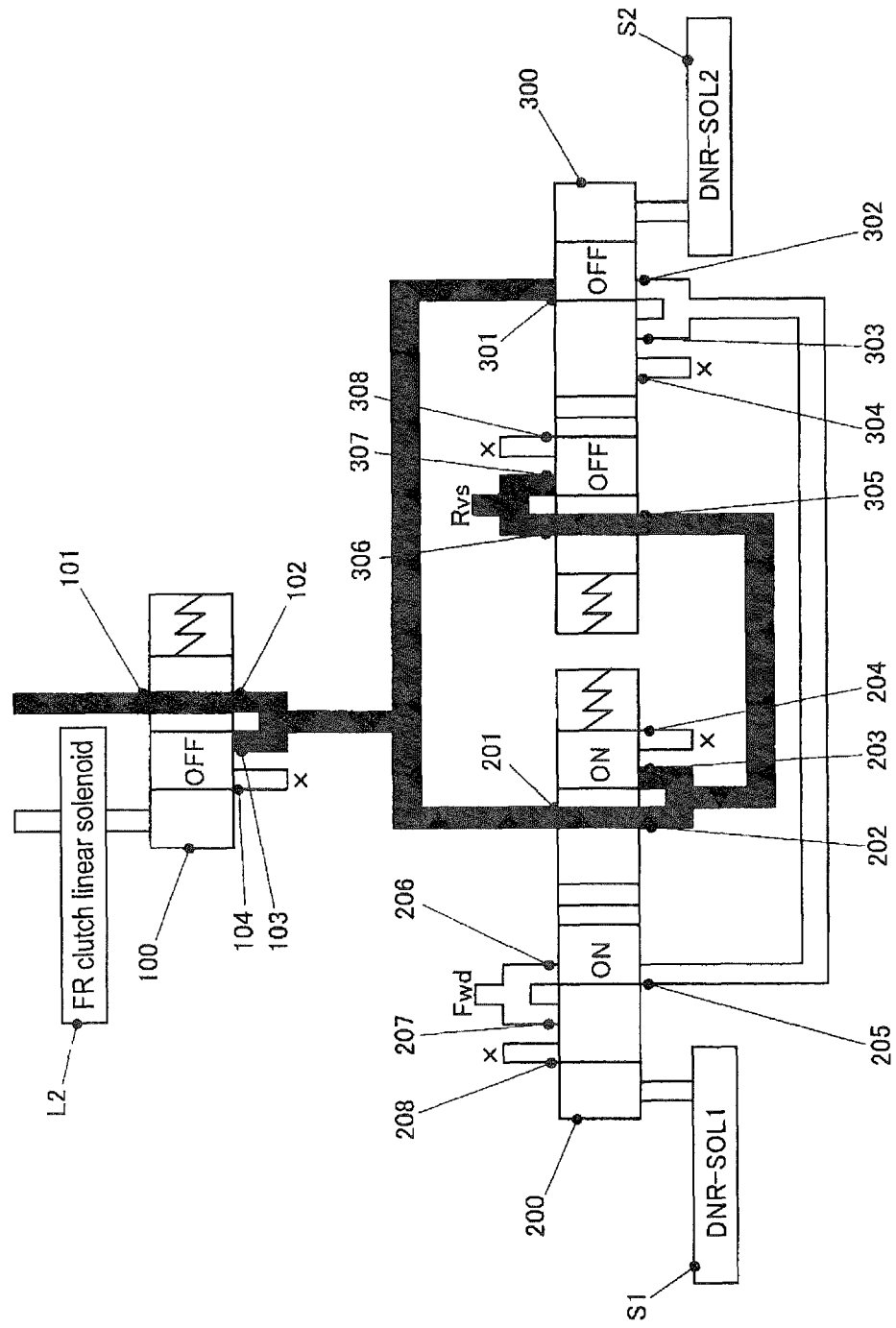
FIG. 4 shows an R range state in the hydraulic circuit shown in FIG. 2.

FIG. 4 illustrates the R range state in the hydraulic circuit of Example 1.

In the state shown in FIG. 4, the FR clutch linear solenoid L2 is OFF, the first DNR solenoid S1 is ON, and the second DNR solenoid S2 is OFF.

As a result, the line pressure is supplied to the reverse clutch through the port 101, spool valve 100, port 102, port 201, spool valve 200, port 202, port 305, spool valve 300, and port 306 in this order.

Since the port 301 is closed, the oil pressure from the port 102 is not directly introduced into the spool valve 300.

<N Range>

Figure 5:
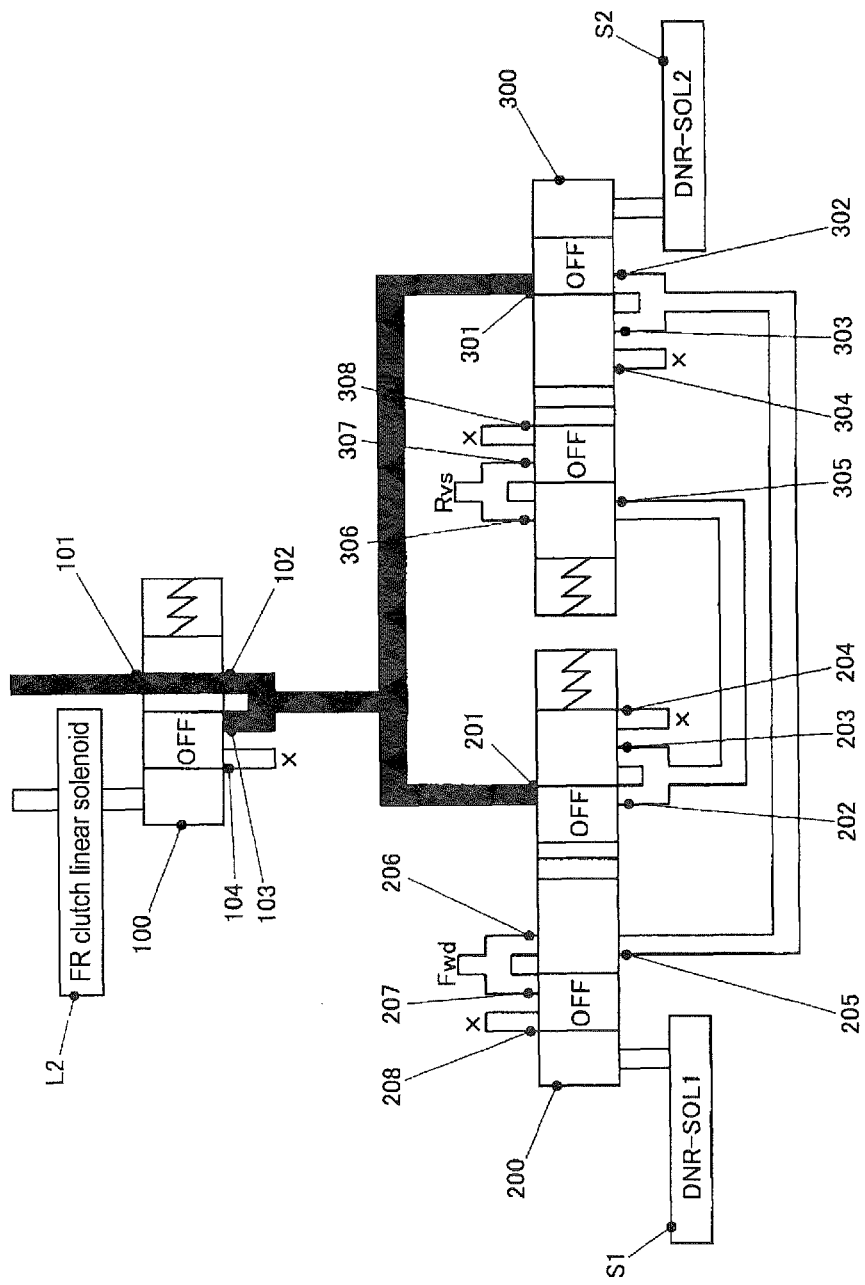
FIG. 5 shows an N range state in the hydraulic circuit shown in FIG. 2.

FIG. 5 illustrates the N range state in the hydraulic circuit of Example 1.

In the N range, the FR clutch linear solenoid L2 is actually controlled to a low-pressure state, but it is shown fixed to a high pressure to facilitate the understanding.

In the state shown in FIG. 5, the FR clutch linear solenoid L2 is OFF, the first DNR solenoid S1 is OFF, and the second DNR solenoid S2 is OFF.

As a result, the line pressure is supplied from the port 102 of the spool valve 100 to the port 201 of the spool valve 200 and to the port 301 of the spool valve 300, but since the ports 201 and 301 are both closed, the oil pressure is not supplied to the forward clutch and the reverse clutch.

Figure 6:
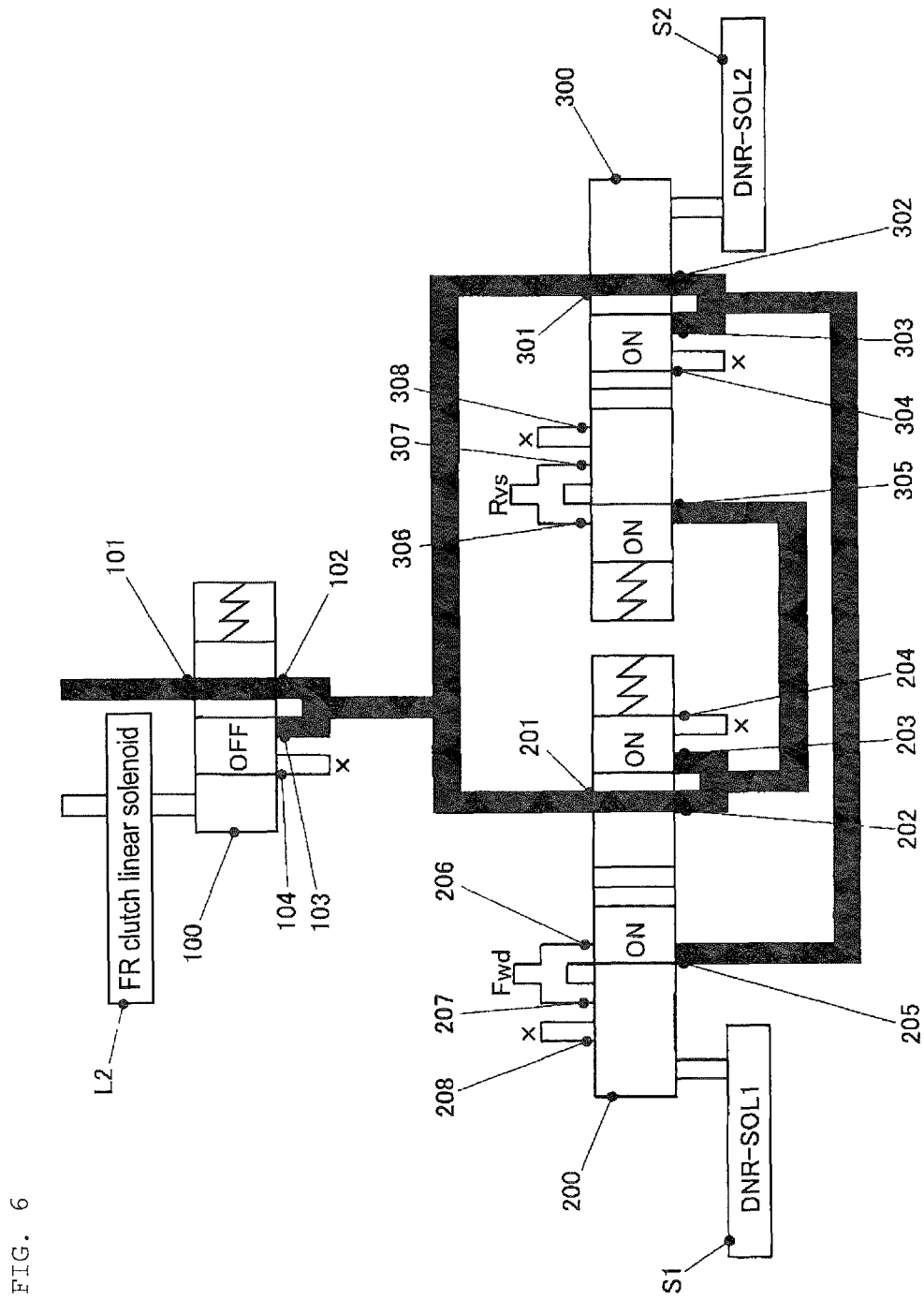
FIG. 6 shows another embodiment of the N range state in the hydraulic circuit shown in FIG. 2.

In Example 1, the N range can be obtained also in the state shown in FIG. 6.

FIG. 6 shows another example of the N range state in the hydraulic circuit of Example 1.

In the state shown in FIG. 6, the line pressure is transmitted from the port 101, spool valve 100, and port 102 to the port 301, the spool valve 300, port 302, and port 205 in this order, and from the port 102 to the port 201, spool valve 200, port 202, and port 305 in this order, but since the ports 205 and 305 are both closed, the oil pressure is not supplied to the forward clutch and the reverse clutch.

As described hereinabove, in Example 1, as a result of switching the D range, R range, and N range by combinations of logical patterns of the states of the spool valves 200 and 300, the switching to the N range is performed even when the state of either of the spool valves 200 and 300 is reversed due to a failure or the like during running in the D range or R range. Therefore, reverse running cannot occur and safety is increased.

Embodiment 2

Embodiment 2 of the range switching device according to the present invention is explained below.

In Embodiment 2, the components substantially identical to those of Embodiment 1 are assigned with the same reference numerals and the explanation thereof is herein omitted. Thus, mainly the differences between the examples are explained.

Figure 7:
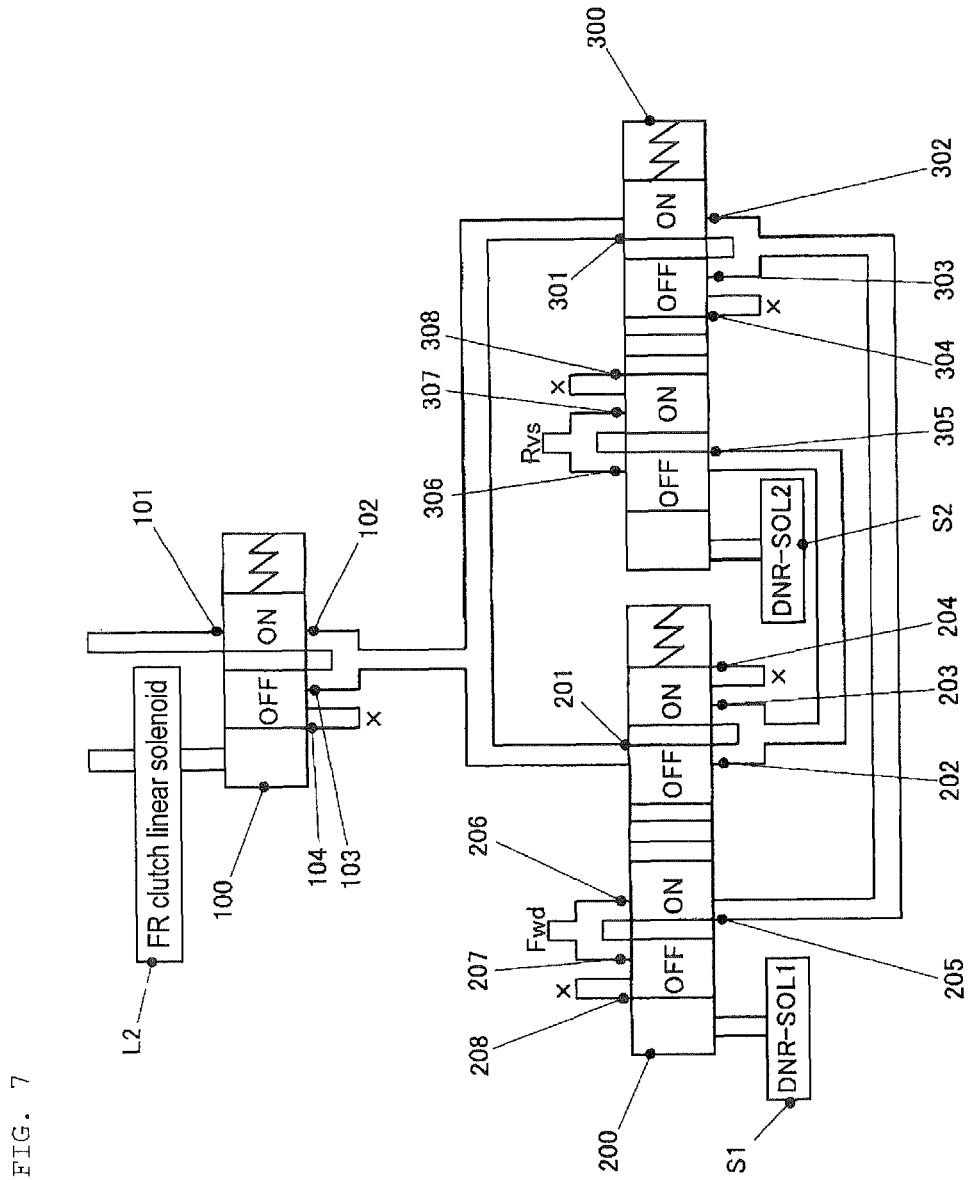
FIG. 7 is a diagram showing a hydraulic circuit of a range switching device of Embodiment 2 according to the present invention.

FIG. 7 shows the hydraulic circuit of the range switching device of Embodiment 2.

In Embodiment 2, the state of the spool valve 300 in relation to the ON/OFF switching of the second DNR solenoid S2 is reversed with respect to that of Example 1.

The effect substantially identical to that of the above-described Embodiment 1 can be also obtained in Example 2.

MODIFICATIONS

The present invention is not limited to the above-described embodiments and various changes and modifications are possible. Those changes and modifications are also included in the technical scope of the present invention.

(1) The range switching devices in the embodiments are provided, for example, at a continuously variable transmission (CVT), but the present invention may be also applied, for example, to transmissions of other types in which shifting between drive and reverse directions is performed by hydraulic engagement elements or fastening elements, such as a step AT using planetary gears.

(2) The shape, structure, and disposition of the elements constituting the range switching device are not limited to those of the embodiments and may be changed as appropriate. For example, the configuration of oil channels that connect the ports of the spool valves and the disposition of the solenoid valves may be changed as appropriate.

(3) In Embodiment 2, the characteristic of the spool valve driven by the second DNR solenoid is reversed with respect to that of Example 1, but the characteristics of other spool valves may be also reversed.

What is claimed is:

1. A range switching device for performing switching among driving ranges including a drive range in which an oil pressure is transmitted to a forward fastening element of a transmission, a reverse range in which the oil pressure is transmitted to a reverse fastening element, and a neutral range in which the oil pressure is substantially not transmitted to either of the forward fastening element and the reverse fastening element, the range switching device comprising:

a first switching valve driven by a first actuator and capable of switching an oil channel by which the oil pressure from an oil pressure supply source is transmitted, between a first state and a second state; and a second switching valve driven by a second actuator and capable of switching an oil channel by which the oil pressure from the oil pressure supply source is transmitted, between a first state and a second state, wherein when the first switching valve is in the first state and the second switching valve is in the second state, the oil pressure is transmitted to the forward fastening element, wherein when the first switching valve is in the second state and the second switching valve is in the first state, the oil pressure is transmitted to the reverse fastening element, and wherein when the first switching valve and the second switching valve are both in the first state or in the second state, oil pressure transmission to the forward fastening element and the reverse fastening element is substantially blocked wherein the oil channel by which the oil pressure is transmitted from the oil pressure supply source to the forward fastening element is constituted by connecting the oil pressure supply source, the first switching valve, the second switching valve, and the forward fastening element in this order, and wherein the oil channel by which the oil pressure is transmitted from the oil pressure supply source to the reverse fastening element is constituted by connecting the oil pressure supply source, the second switching valve, the first switching valve, and the reverse fastening element in this order.

2. The range switching device according to claim 1, wherein the neutral range is switched to when energizing of the first actuator and energizing of the second actuator are both blocked, and when the oil pressure transmission to the forward fastening element and to the reverse fastening element is substantially blocked.

3. A range switching device for performing switching among a drive range in which an oil pressure is transmitted to a forward fastening element of a transmission, a reverse range in which the oil pressure is transmitted to a reverse fastening element, and a neutral range in which the oil pressure is substantially not transmitted to either of the forward fastening element and the reverse fastening element, the range switching device comprising:

a first switching valve driven by a first actuator and capable of switching an oil channel by which the oil pressure from an oil pressure supply source is transmitted, between a first state and a second state; and a second switching valve driven by a second actuator and capable of switching an oil channel by which the oil pressure from the oil pressure supply source is transmitted, between a first state and a second state, wherein the oil channel by which the oil pressure is transmitted from the oil pressure supply source to the forward fastening element is constituted by connecting the oil pressure supply source, the first switching valve, the second switching valve, and the forward fastening element in this order, and wherein the oil channel by which the oil pressure is transmitted from the oil pressure supply source to the reverse fastening element is constituted by connecting the oil pressure supply source, the second switching valve, the first switching valve, and the reverse fastening element in this order.

4. The range switching device according to claim 1, wherein the range switching device includes only the first switching valve and the second switching valve.

* * * * *